United States Patent
Koide

(10) Patent No.: US 7,068,586 B2
(45) Date of Patent: *Jun. 27, 2006

(54) OPTICAL DISK

(75) Inventor: Hiroshi Koide, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 29 days.

This patent is subject to a terminal disclaimer.

(21) Appl. No.: 10/742,976

(22) Filed: Dec. 23, 2003

(65) Prior Publication Data

US 2004/0136283 A1    Jul. 15, 2004

Related U.S. Application Data

(63) Continuation of application No. 09/532,089, filed on Mar. 21, 2000, now Pat. No. 6,704,273.

(30) Foreign Application Priority Data

Mar. 30, 1999  (JP)  .................. 11-90225
Feb. 29, 2000  (JP)  ................ 2000-53951

(51) Int. Cl.
*G11B 7/00*    (2006.01)

(52) U.S. Cl. .................. 369/275.3; 369/59.13

(58) Field of Classification Search ............ 369/275.4, 369/275.3, 53.15, 53.17, 59.13; G11B 7/00
See application file for complete search history.

(56) References Cited

U.S. PATENT DOCUMENTS

| 4,924,331 | A | * | 5/1990 | Robinson et al. .......... 360/72.1 |
| 5,132,954 | A |   | 7/1992 | Kulakowski et al. |
| 5,414,689 | A |   | 5/1995 | Maeda et al. |
| 5,831,954 | A |   | 11/1998 | Sako et al. |
| 6,061,760 | A | * | 5/2000 | Huang ........................ 711/112 |
| 6,137,756 | A |   | 10/2000 | Yoshida et al. |
| 6,160,778 | A |   | 12/2000 | Ito et al. |
| 6,256,282 | B1 |  | 7/2001 | Yamagami et al. |
| 6,385,149 | B1 |  | 5/2002 | Sekii |
| 6,704,273 | B1 | * | 3/2004 | Koide ..................... 369/275.3 |

FOREIGN PATENT DOCUMENTS

| JP | 63-124268 | 5/1988 |
| JP | 63-316366 | 12/1988 |
| JP | 08-255432 | 10/1996 |
| JP | 09-326138 | 12/1997 |
| JP | 10-320925 | 12/1998 |
| WO | WO 98/28822 | 9/1996 |
| WO | WO 96/33492 | 12/1996 |

* cited by examiner

*Primary Examiner*—A M Psitos
(74) *Attorney, Agent, or Firm*—Dickstein Shapiro Morin & Oshinsky LLP

(57) ABSTRACT

The optical disk is a data-writable optical disk and it has a defect processing selection area. Data indicating whether a defect processing is to be executed or not, or data indicating whether the defect processing is to be executed using a disk drive or using a computer is stored in the defect processing selection area. The address of this defect processing selection area is recorded by making the use of a wobbled guide groove.

10 Claims, 6 Drawing Sheets

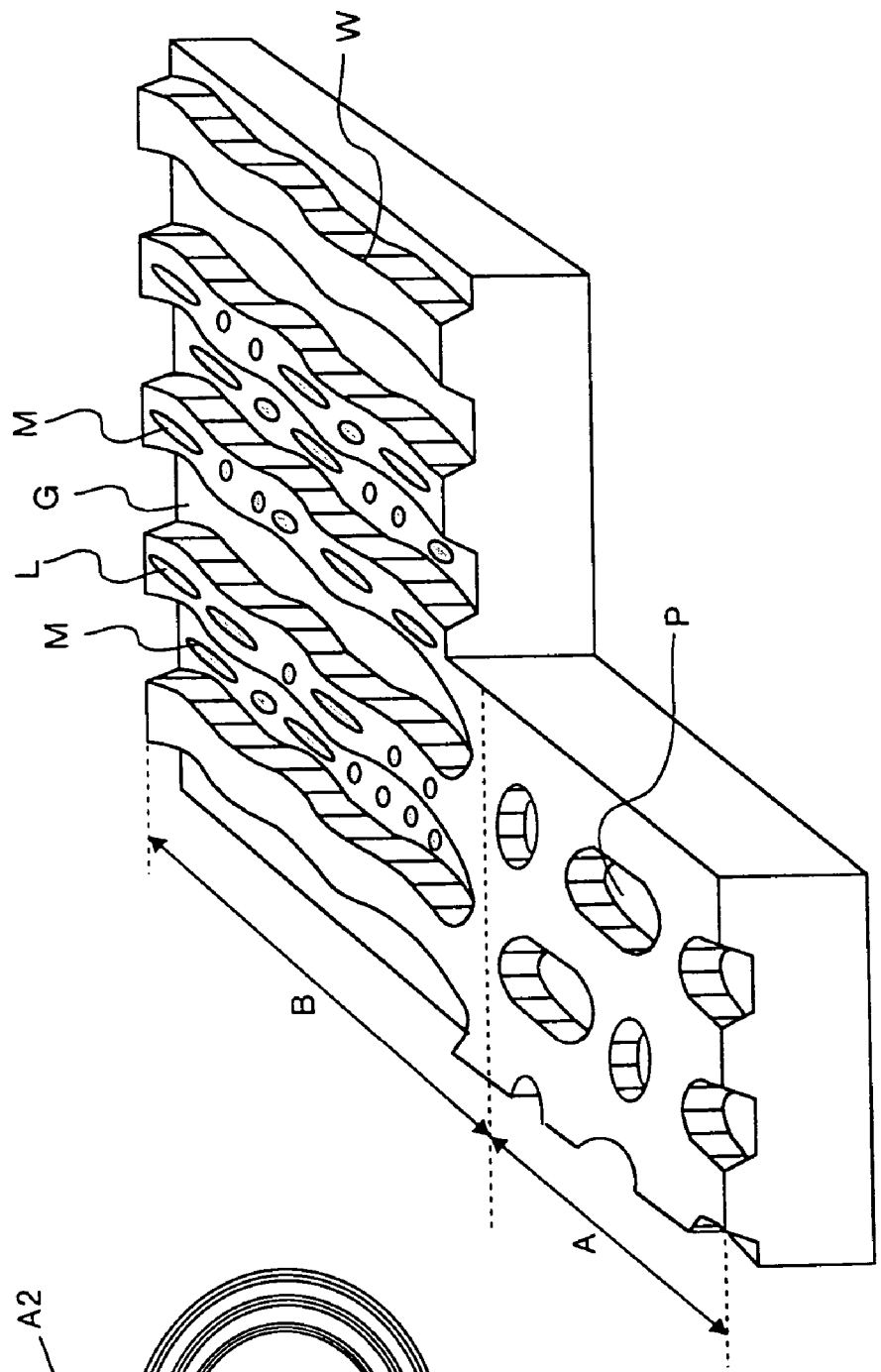
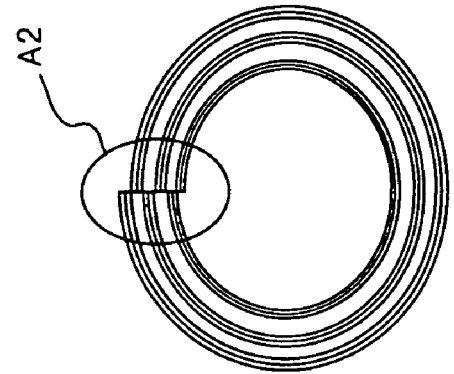

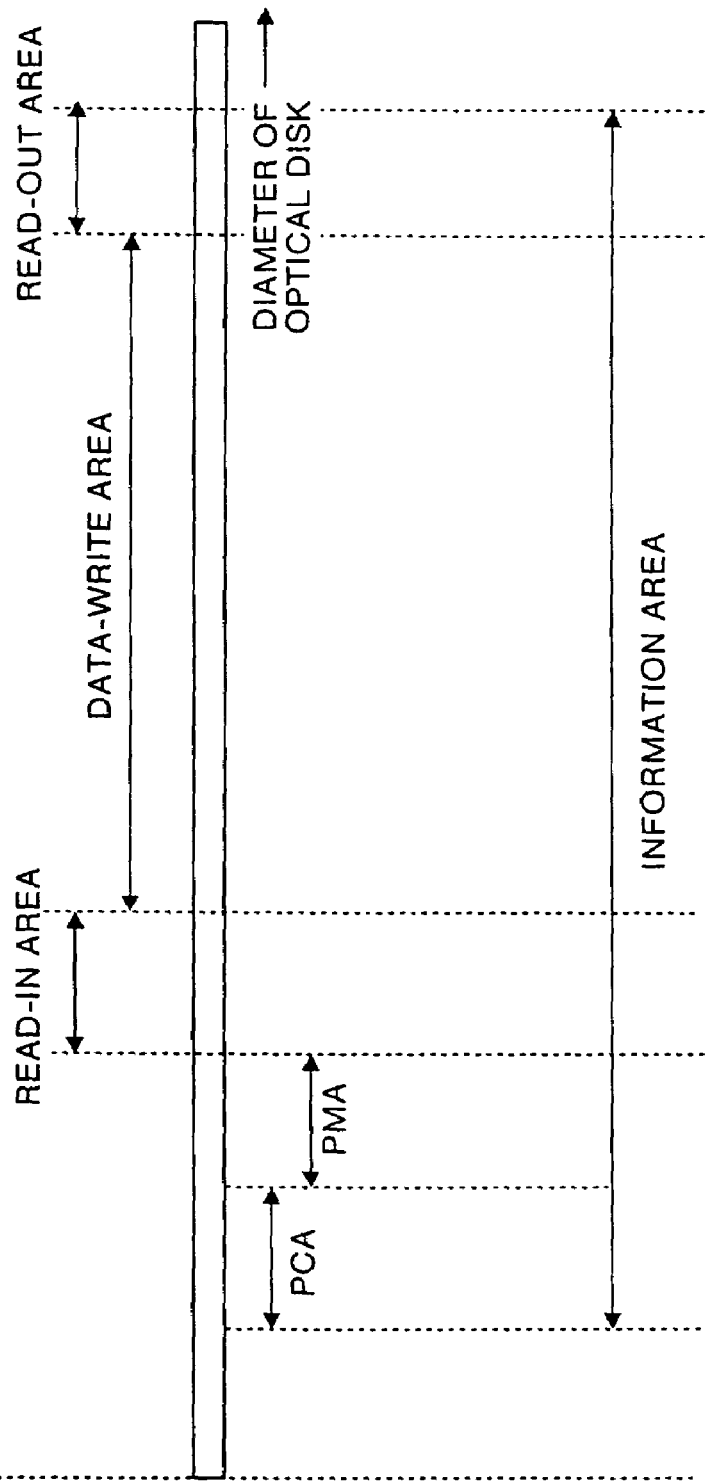

OPTICAL DISK

This application is a continuation of U.S. patent application Ser. No. 09/532,089, filed Mar. 21, 2000, now U.S. Pat. No. 6,704,273, the entirety of which is incorporated herein by reference.

FIELD OF THE INVENTION

The present invention relates to an optical disk. More specifically, this invention relates to an optical disk in which data can be written.

BACKGROUND OF THE INVENTION

Various types of data-writable optical disk such as CD (Compact Disk) or DVD (Digital Versatile Disk) have been put into practical use. When data is written in the data-writable optical disk, the written data is immediately reproduced to verify whether the data has been recorded normally or not. When it is determined as a result of verification that there is a defect in a sector in which the data is written and the data has not correctly been recorded there, the data in such a sector is written in another sector. The series of operations described above is expressed as defect processing.

In the defect processing, data which can not be written in a defective sector is written in another sector (alternative sector). The data of the alternative sector is then recorded on the optical disk. Recording of data concerning the alternative sector is executed by an optical disk drive. Control for the defect processing may be executed utilizing the disk drive itself (expressed as defect processing using a disk drive), or it may be executed utilizing a computer connected to the disk drive (expressed as defect processing using a computer).

When the defect processing is executed using a disk drive, it is necessary to previously prepare an area (alternative area) in which records on management of the alternative sector are recorded and an area as an alternative sector in the optical disk. Resultantly, area which can be used for recording the data is reduced by the alternative area and altentative sector.

On the other hand, when the defect processing is executed using a computer, address of the defective area and data concerning an area as an alternative sector for the data which is originally to be written at the address are managed by the computer, and are written in an area decided by the computer when the defect processing comes to the end. Thus, it is not necessary to previously acquire an alternative area nor an alternative sector on the optical disk, and the influence over a recording capacity of the optical disk is rather small. However, the computer is required to access the disk drive many times, and hence the processing speed is lower as compared to the case when the defect processing is performed using the disk drive.

Conventionally whether the defect processing to be executed using a disk drive or using a computer is decided according to a type of the optical disk. For instance, in the case of an optical disk in which an application for use in a personal computer is written, since a high speed access is desired, the defect processing is executed using the disk drive. In the case of applications requiring a large quantity of data to be written in an optical disk and relatively little affected by a defect of data, the defect processing is preferably executed using the computer.

Concretely, for instance, in the case of the DVD-RAM (DVD-Random Access Memory), alternative area is previously acquired in the fixed state, and the defect processing is executed using the disk drive. In the case of CD-RW (Compact Disk- Rewritable) is the defect processing generally executed using a computer.

As described above, the defect processing is executed using the disk drive or using the computer according to a type of writable optical disk. Therefore, data is recorded with different formats in an optical disk in which the defect processing is executed using a disk drive and in an optical disk in which the defect processing is executed using a computer. Further, an optical disk dedicated to data reproduction is formatted based on other system in which the defect processing is not taken into considerations.

Further, there are various types of formats for an optical disk which correspond to other needs. For instance, in a format suited to high speed access, a set of "an address data area comprising successive pit arrays (pit ID section)", "a data area comprising written mark arrays", and "a gap area in which no data is written" is repeatedly formed on an optical disk.

In an optical disk used for so-called random access in which data stored in the same area may be rewritten (over-written) thousand times or more by using a phase-change type of optical disk, there is provided a gap (for instance, 2 KB) between data each having a fixed length (for instance, 32 KB). This configuration is employed to provide an allowance enabling random shift of a position of data having a fixed length (for instance, random shift within a range of ±63 B).

As described above, there are various formats for optical disks currently available in correspondence to various conditions such as access time, application, and whether execution of the defect processing is required or not. Therefore, optical disk producers have produced optical disks based on various formats.

In order to produce optical disks based on various formats, however, it is required for each producer to have various types of production facilities. This disadvantageously increases the production cost of the optical disk. Further, a plan for production of optical disks and stock management become complicated, which is disadvantageous in improving cost performance of optical disks.

On the other hand, users which purchase optical disks are required to select optical disks each formatted with a form suited to a purpose of use or an application from various types of optical disks. To satisfy this requirement, the users are required to have a certain degree of knowledge concerning formats of optical disks.

In addition, in the format in which a set consisting of a pit ID section, a data area, and a gap area is repeatedly provided, the pit ID sections are provided at a specified gap between data areas. Because of this configuration, the data area is interrupted at a specified interval, which makes it difficult to continuously record data.

Further in the writable optical disk, it is desired that data once written therein can be reproduced with a disk drive dedicated to data reproduction. To reproduce data stored in an optical disk formatted with a form in which pit ID sections are provided at a prespecified gap with a disk drive dedicated to data reproduction, it is necessary to add a function for skipping the pit ID section in reading data to the disk drive. Namely, the data recorded in the optical disk as described above can not be reproduced with a disk drive dedicated to data reproduction.

SUMMARY OF THE INVENTION

It is an object of the present invention to provide a format enabling the defect processing using either a computer or a disk drive and thus improve the productivity in production of optical disks and also the convenience in purchase thereof. It is another object of the present invention to provide a format for an optical disk making it possible to continuously record and reproduce data without interruption. It is still another object of the present invention to enable easy realization of reproduction of data recorded in the optical disks described above with a reproduction-dedicated disk drive.

The optical disk is a data-writable optical disk and it has a defect processing selection area. Data indicating whether a defect processing is to be executed or not, or data indicating whether the defect processing is to be executed using a disk drive or using a computer is stored in this defect processing selection area. The address of this defect processing selection area is recorded by making the use of a wobbled guide groove. When the optical disk is to be used in a computer, data in the defect processing selection area can be read, and from this data it can be decided whether defect processing is to be executed or not, or whether the defect processing is to be executed using a disk drive or using a computer. Thus the need of producing optical disks with different formats is eliminated.

Other objects and features of this invention will become apparent from the following description with reference to the accompanying drawings.

BRIEF DESCRIPTION OF THE DRAWINGS

FIG. 3A and FIG. 3B explain the difference between the configurations shown in FIG. 1 and that shown in FIG. 2.

FIG. 4 shows an example of a relation between a position in a radial direction of an optical disk and type of data recorded at the position;

DESCRIPTION OF THE PREFERRED EMBODIMENTS

Embodiment of the present invention are explained below. An optical disk according to this embodiment is a data-writable optical disk, and this optical disk is formatted so that it has a defect processing selection area in which data indicating whether the defect processing is executed or not, or data indicating whether the defect processing is to be executed using a disk drive or using a computer are written. Further, the optical disk according to this embodiment has wobbled guide grooves, or prepits (land prepits) each formed between the guide grooves, and records at least data concerning an address of a data write area in which data is written with the guide grooves or with the land prepits. At first configuration in which data concerning an address is recorded by using the guide groove or a land prepit is described, and then the defect processing selection area is explained.

Figure 1A:
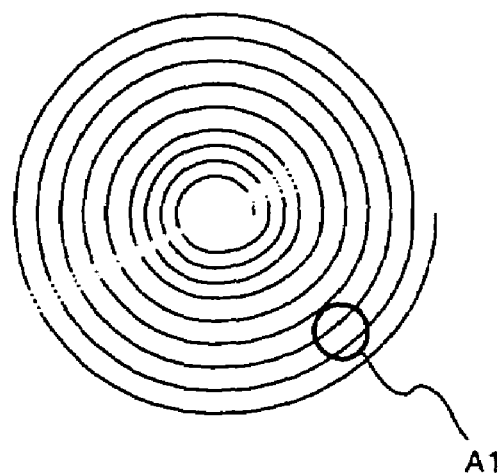
FIG. 1A shows a top view of the configuration according to one embodiment of the present invention.
Figure 1B:
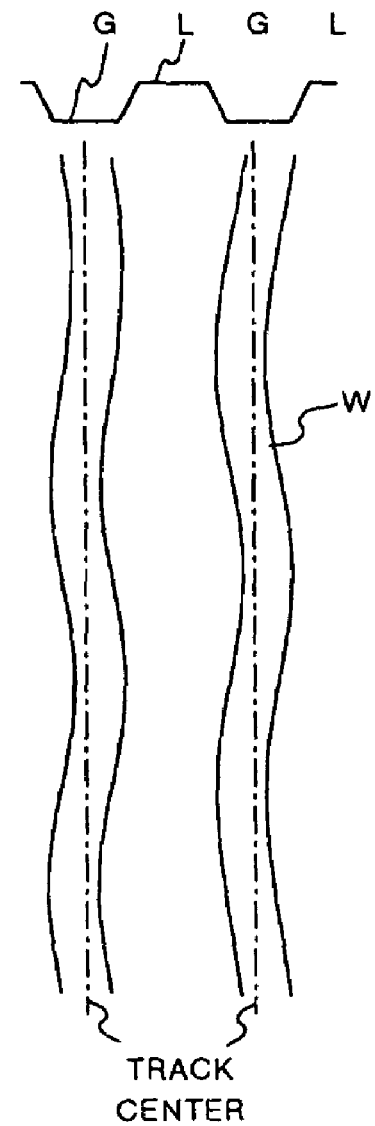
FIG. 1B is an enlarged view showing a portion in the area A1 in FIG. 1A.

FIG. 1A and FIG. 1B show an embodiment of the present invention in which data required for data write is recorded with the guide groove. The configuration shown in these figures is employed in a data-writable optical disk, a CD-R (Compact Disk-Recordable), and a CD-RW (Compact Disk-Re Writable). FIG. 1A shows a situation in which a wobbled guide track is formed in a spiral form, while FIG. 1B shows an enlarged view of a portion defined by a circle A1 in FIG. 1A. A guide groove W formed with a groove G on the optical disk shown in FIG. 1B slightly wobbles in the radial direction of the optical disk (a radius of around ±0.03 μm). A signal obtained by detecting wobbling is called a wobble signal.

The wobble signal is a single that represents a data previously set for each optical disk. In this embodiment, wobble of a guide groove is modulated so that the wobble signal indicates optimal conditions for recording data on an optical disk with an address signal (ID signal) or a laser beam, namely an optimal recording pulse strategy, an optimal laser power, a media attribute (that is, A type of the optical disk) of the like. When the optical disk shown in FIG. 1 is a CD-RW, one of the layers shown in the upper section in FIG. 1B is a phase-change type of recording film as a recording layer. This recording layer is made from a four-element material consisting of silver, indium, antimony, and tellurium.

Figure 2:
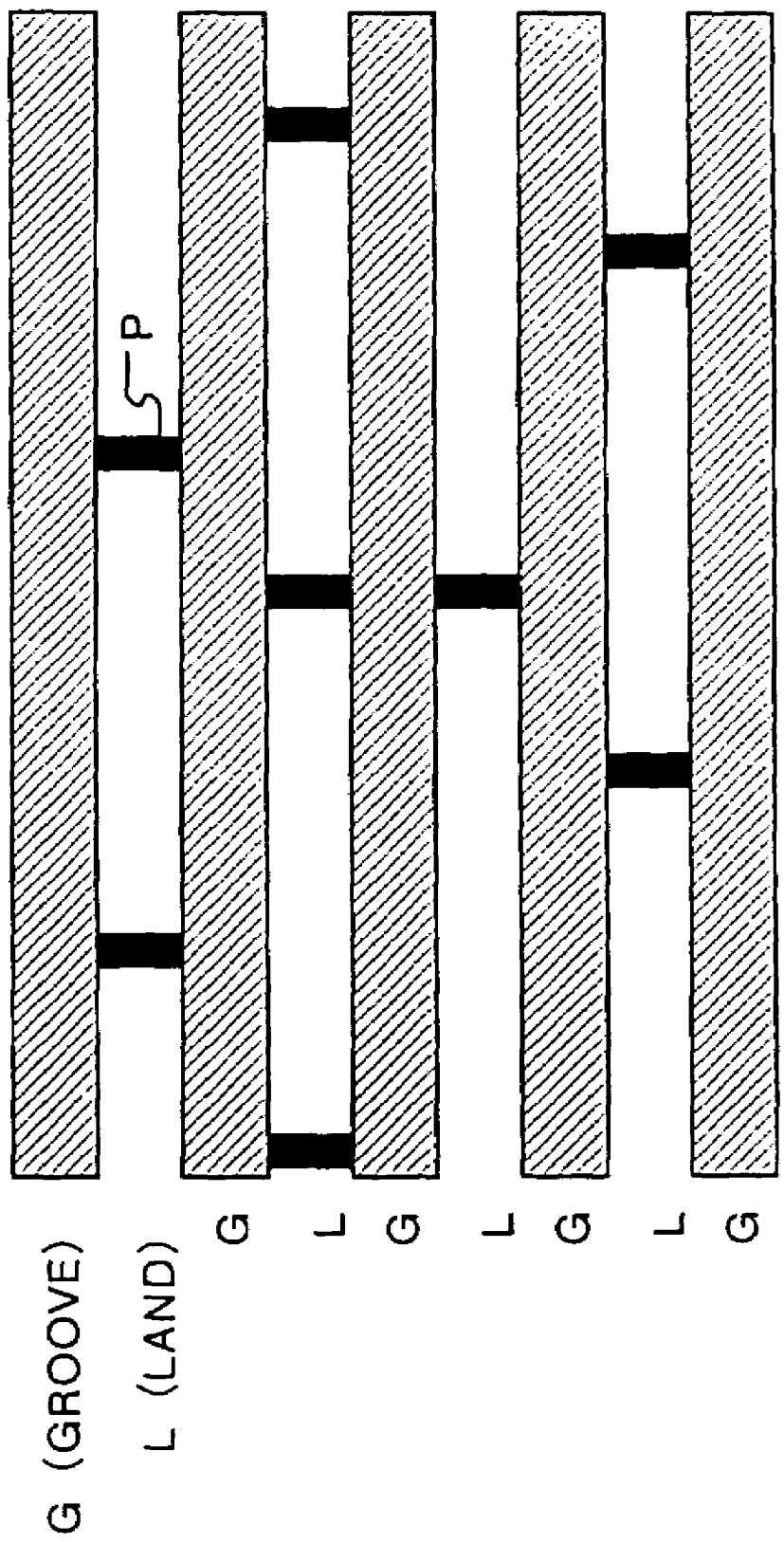
FIG. 2 shows another embodiment of the present invention.
Figure 5B:
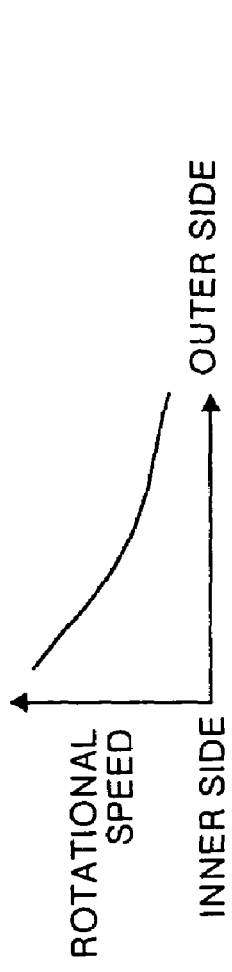
FIG. 5A to FIG. 5D explain a CLV format.
Figure 5C:
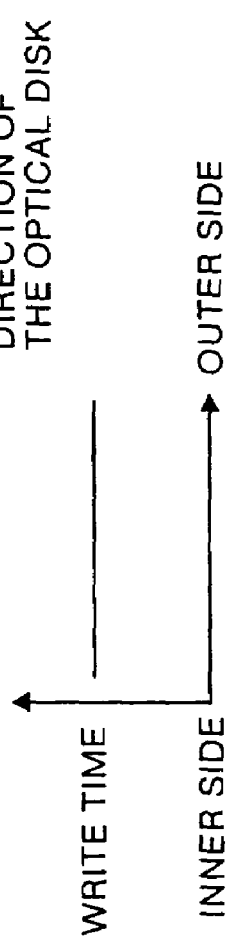
Figure 5D:
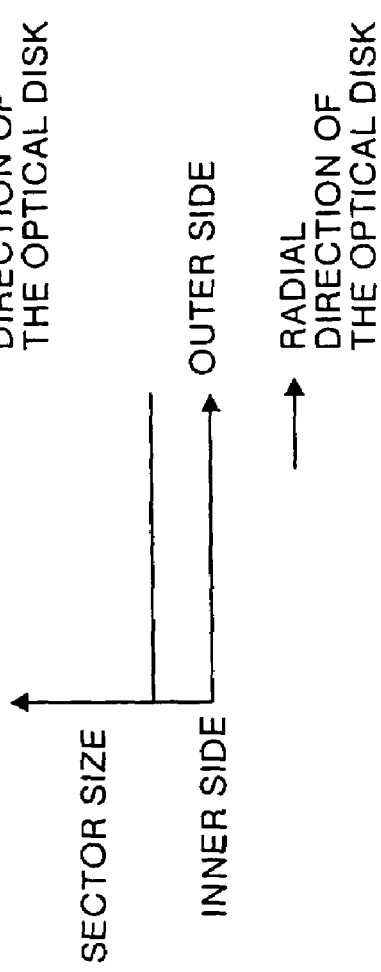
Figure 5A:
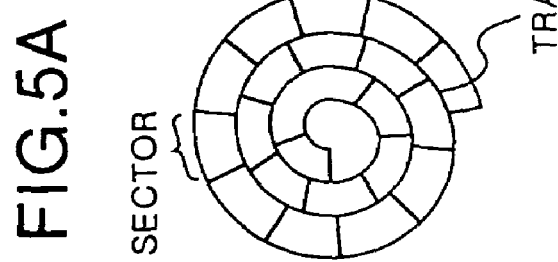
Figure 6:
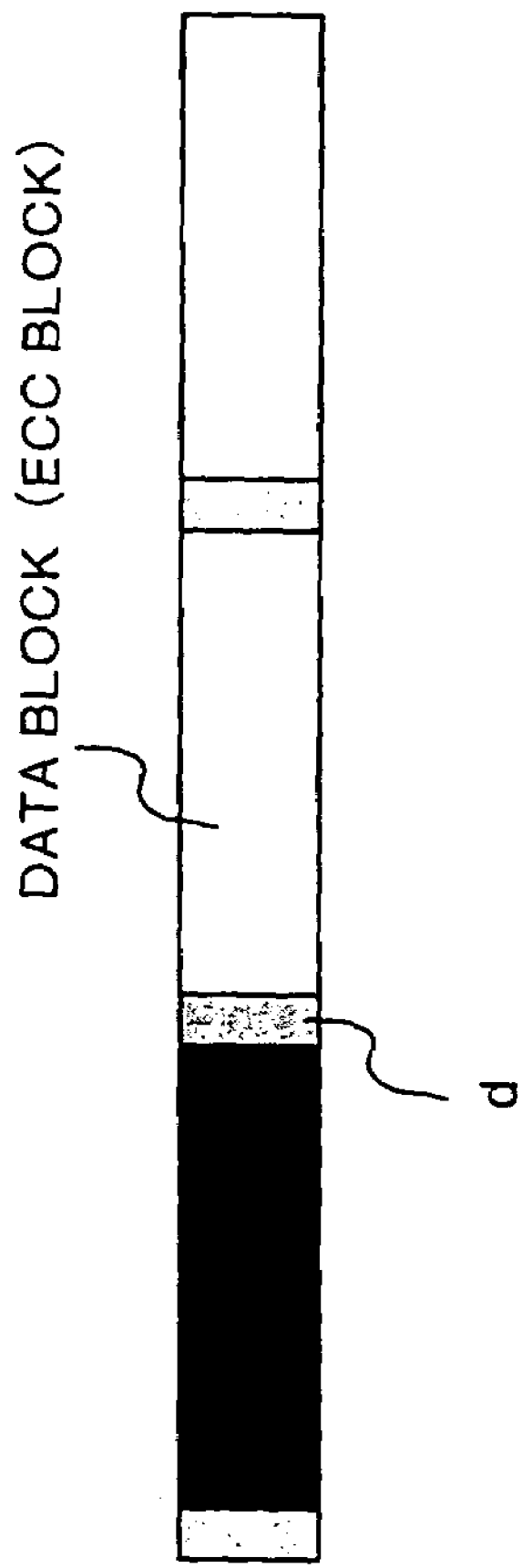
FIG. 6 shows data configuration in which a blank space is provided between fixed length data blocks.

FIG. 2 shows another embodiment of the present invention in which data required for data writing is recorded with a land prepit. In the configuration shown in FIG. 2, the optical disk according to the present invention is formatted with a basic format employed in the DVD-R (DVD-Recordable) or in the DVD-RW (DVD-Rewritable). The configuration shown in FIG. 2 has wobbled grooves (guide grooves) G and land prepits P each formed between the grooves G.

Wobble of the groove G shown in FIG. 2 wobbles with a prespecified cycle, and generates a wobble signal used for generation of a motor control signal or basic recording clocks. On the other hand, in FIG. 2, the land prepits P are successively formed between the grooves G (on the outer side in the radiation direction of the optical disk), and address data (ID data) of the groove G, the optimal recording pulse strategy and optimal laser power when data is recorded on the optical disk, a media attribute or other data are recorded in the land prepits P.

FIG. 3A and FIG. 3B each show, for comparison with FIG. 1 and FIG. 2, a format of an optical disk in which the present invention can not be applied. FIG. 3A shows that a guide groove is formed in a spiral form, while FIG. 3B shows an enlarged view of a portion defined by an ellipse A2 shown in FIG. 3A, namely, a surface of a recording film of the optical disk.

On a surface of the recording film shown in FIG. 3B, there are a user data area B used by a user for recording data therein and an address data area (ID area) A in which data concerning an address of the user data area B is recorded. Guide grooves are formed on the user data area B, and lands L and grooves G are generated by the guide grooves (tracks).

One track circle is divided into a plurality of sectors. Each sector consists of the address data area A and the user data area B. The address data area A is present at the head of each sector, and an address signal or a synchronization signal is previously recorded therein as a form of prepit P. In the user data area B, record marks M are recorded in both the land L and groove G.

In the format shown in FIG. 3B, since the address data areas A are present at a fixed cycle on each track circuit, a quantity of data recorded on the optical disk is reduced, and further data can not be reproduced seamlessly. The format in which the address data areas are defined at a fixed cycle is not intended for recording data seamlessly. Therefore, an area for the defect processing such as an alternative sector or an alternative area is defined. Because of this feature, data recorded in the data-writable optical disk formatted based on the format shown in FIG. 3 can not be read out with the reproduction-dedicated disk drive currently available.

Different from the optical disk shown in FIG. 3B, in the optical disk having the configuration shown in FIG. 1B and FIG. 2, address data used for accessing a target position is recorded in a groove or in a prepit. Because of this feature, address data is not mixed in user data cyclically, and user data can be recorded seamlessly.

The defect processing selection area in this embodiment is described below.

In the optical disk according to this embodiment, the defect processing selection area in which whether the defect processing for the optical disk should be executed using a disk drive or using a computer is written is provided. This defect processing selection area may be present in any sector on the optical disk, and data for the defect processing may be recorded by the producer when the optical disk is shipped, or with a disk drive after purchase according to the user's selection, or may be written based on selection by any of an application system, an operation system, or a driver software each working on a computer. It is possible to decide whether the defect processing is to be executed using the disk drive or using the computer by writing only 1 or 0 in the defect processing selection area.

To improve convenience in use, it has been desired that data recorded in a data-writable optical disk such as the CD-R, CD-RW, and DVD-R can be reproduced with a reproduction-dedicated disk driver. To satisfy this need, in this embodiment, data not defined in a reproduction-dedicated optical disk which is one of data-writable optical disks is written is written in an area other than an area in which data common to a data-writable optical disk and a reproduction-dedicated optical disk is written, or in an area which is not recognized by a reproduction-dedicated disk drive.

The contents of the above mentioned process is described in detail below.

FIG. 4 shows an example of a relation between a position in the radial direction of an optical disk and a type of data to be recorded there. For instance, in a case of a reproduction-dedicated optical disk like a CD, read-in areas, data-write areas, and read-out areas are provided in the entire area (information area) of the optical disk. The read-in area is an area storing therein, for instance, data recorded as a TOC (Table of Contents) indicating a header address of each data block recorded in the optical disk. The data-write area is an area in which user data is recorded. The read-out area is an area in which data enabling use of the optical disk with a CD-ROM device is written.

The data-writable optical disk includes, in addition to the read-in area, data-writable area, and read-out area which are provided also in a reproduction dedicated optical disk, a PCA (Power Calibration Area), and a PMA (Program Memory Area) The PCA is an area in which data is recorded for trial to calibrate a power of a laser used for writing data therein). The PMA is an area in which a transitional TOC is temporally recorded until an operation for additionally writing data therein is finished in a data-rewritable optical disk.

In this embodiment, an area which is provided in a data-writable optical disk such as a PCA or a PCM is provided outside an area which is provided also in a reproduction-dedicated optical disk. Because of this configuration, data recorded in the data-writable optical disk according to this embodiment can also be reproduced with a reproduction-dedicated disk drive. In the example shown in FIG. 4, the PCA and PMA areas are provided on the inner side in the radial direction of the optical disk from the data write area and read-out area.

In the optical disks such as a DVD-RW or a DVD-R, formatting is executed so that an area which is provided only in a data-writable optical disk is provided on the outer side in the radial direction of the optical disk from a common area for the DVD-RAM, and because of this configuration data can be reproduced also with a reproduction-dedicated disk drive.

The defect processing selection area according to the present invention is provided in an area other than the read-in area, data-write area, and read-out area shown in FIG. 4. When formatting is executed so that the defect processing is executed by a disk drive, an alternative area is provided at the head of the data-write area. The alternative area is provided to prepare for generation of a defective sector.

The optical disks are not limited to the configuration described above. There is an area on a laser disk and dedicated for reproduction, which is not the object of data reproduction and is apart from an area that is common to a data-writable optical disk. The read-in area and read-out area include an area from which data cannot be read out. In a data-writable optical disk, even when the defect processing selection area is provided in an area corresponding to the area which is not an object for reproduction and data read, data recorded in this data-writable optical disk can be reproduced using a reproduction-dedicated disk drive.

Configuration is allowable in which data is not written in the defect processing selection area before the defect processing is executed, and further in which, when the defect processing is executed, data indicating whether the defect processing is executed using a disk drive or a computer in the defect processing selection area. An alternative area and an alternative sector are provided after the data-writable area. With this configuration, even when a reproduction-dedicated optical disk reads data written in the defect processing selection area for some reason or other, the possibility of malfunction of the disk drive is very small.

In this embodiment, a data-writable optical disk is formatted based on the CLV (Constant Linear Velocity) system. FIG. 5A to FIG. 5D explain this CLV system. As shown in these figures, a track comprising a groove (guide groove) is formed in a spiral form along the peripheral direction, and this track is divided into sectors (see FIG. 5A). In CLV system, data writing speed is kept constant (see FIG. 5C) irrespective of a position in the radial direction by changing the rotational speed of the optical disk (see FIG. 5B).

In the CLV system, even when a position on the optical disk changes in the radial direction, the sector size is kept constant (see FIG. 5D), and a gap between recording marks M is kept constant irrespective of a position in the radial direction of the optical disk. Because of this feature, it may be said that the CLV system produces an advantageous format because the recording capacity is larger as compared to that in the CAV (Constant Angular Velocity) system in which a gap between the recording marks M becomes larger as a position changes from the inner side to the outer side. In the CLV system, sector size or gap between recording marks M are constant irrespective of a position in the radial direction on the optical disk so that address management for data successively recorded (computing for obtaining an address) becomes easier. Further, the system easily satisfies the needs for recording data seamlessly, and accommodates sectors with various lengths, and a format of an optical disk in which a gap is provided between data blocks.

Data recorded in the optical disk formatted as described above according to this embodiment is processed as explained below. It is assumed in the following explanation that data indicating whether the defect processing is to be executed using a disk drive or using a computer when a defect is detected after purchase thereof is written in the defect processing selection area.

When an optical disk according to this embodiment in which data is written in the defect processing selection area is set in a disk drive connected, for instance, of a computer such as a personal computer, the following process is performed.

(1) The computer issues an instruction for reading the data written in the defect processing selection area to a disk drive, and the disk drive reads the data according to the instruction. When contents of the data indicates that the defect processing is to be executed using a computer, the computer transfers the data to the disk drive based on a data recording request from an application, and further gives an instruction for writing the transferred data at a specified address of the optical disk to the disk drive. The computer reads out data written by the disk drive according to the necessity, and verifies the data to the transferred data.

When it is determined as the result of verification that the read-out data is coincident to the transferred data, the process of transferring the data in the computer is terminated. When it is determined as the result of verification that the read-out data is not coincident to the transferred data, the computer specifies another address and transfers the data to the disk drive. The computer then gives an instruction for writing data at the specified address to the disk drive, and verifies a result of operation for writing the data. The computer repeats the series of operations until the data is written correctly.

The computer manages data concerning an address where a defect is found on the optical disk and an alternative sector for a sector specified with the address. When the defect processing is over, the computer decides an alternative area on the optical disk, and records the managed data in the alternative area. In this recording step, also verification is executed.

(2) On the other hand, when contents of data read by a disk drive indicates that the defect processing is to be executed using the disk drive, the computer changes the control mode so that the defect processing is executed using the disk drive. When a defect is found in an area in which data is to be written, the disk drive writes the data in an alternative sector, and records a management record for the alternative sector in the alternative area.

The disk drive reads out the written data, and verifies whether the data has been recorded correctly or not. When it is determined as the result of verification that the data has not been recorded correctly, the disk drive writes the transferred data in the alternative sector, and further writes addresses of the defective address and alternative sector in the alternative area for management of the alternative sector. With the processing sequence described above, when a request for reproduction of data is sent from the computer, the disk drive can read out data written in the alternative sector and send the data to the computer.

When an optical disk according to the present invention in which data concerning a defect processing selection area is not written (virgin disk) is set in a disk drive connected, for instance, of a computer such as a personal computer, the following process is performed.

Generally whether the defect processing is to be executed using a disk drive or using a computer is decided according to the application program in the optical disk. The computer determines which application program is recorded in the optical disk, and sends a result of determination to the disk drive. The disk drive receives an instruction from the computer, and writes a data identifying whether the defect processing is to be executed using the disk drive or using the computer in the defect processing selection area. The computer executes the processes (1) or (2) described above based on the data written in the defect processing selection area.

With the embodiment described above, a producer of optical disks can produce optical disks having the same format, yet applicable for various applications, which makes it possible to reduce types of facilities required for production of optical disks. Further, stock management and production plans become easier so that the productivity in optical disk production is improved.

A user can make a selection after purchase of an optical disk whether the defect processing is to be executed using a computer when it is required to insure a large memory space for recording data, or using a disk drive when it is required to execute data processing at a high speed. Therefore, a user can purchase any optical disk without being bothered by the problem of whether the defect processing is to be executed using a computer or using a disk drive.

With the present invention, as data concerning an address is recorded with wobble of a guide groove or a land pit, a data area is not interrupted by an address area. Therefore, data can be written or reproduced continuously.

In this embodiment, data concerning an address is not reproduced periodically, and because of this feature, a disk drive is not required to read over address data. Therefore, data recorded in the data-writable optical disk according to this embodiment can be reproduced using a reproduction-dedicated disk drive.

The present invention is not limited to the embodiment described above. In the embodiment described above, the optical disk is a CD-R, a CD-RW, or a DVD-R. However, the present invention is applicable to a rewritable optical disk having different configuration, and the same effects as those in the embodiment described above can be achieved even when the present invention is applied to the WORM (Write Once Read Many) type of optical disk.

According to the present invention, it is possible to provide a format of an optical disk which can be used irrespective of whether the defect processing is to be executed using a disk drive or using a computer. Therefore, the productivity in optical disk production and easiness in purchase can be improved.

Further, it is possible to provide a format of an optical disk which can be accessed at a high speed and also enables recording and reproduction of data without interruption. In addition, it is not necessary to add a function for reading over data concerning an address, and it is possible to reproduce data recorded in a data-writable optical disk with the existing type of reproduction-dedicated disk drive.

Further, the defect processing can be executed in an optical disk having a common format either using a disk drive or using a computer, and the productivity in optical disk production and easiness in purchase can be improved.

Further, it is possible to reproduce data recorded in a data-writable optical disk with a reproduction-dedicated disk drive irrespective of whether data specific to the data-writable optical disk is recorded therein or not.

Further, it is possible to provide a format of an optical disk which can respond to applications requiring a quantity of allowance capacity between fixed length data and can satisfy more needs as compared to the conventional type of optical disks.

The present document incorporated by reference the entire contents of Japanese priority document, 11-90225 filed in Japan on Mar. 30, 1999 and 2000-53951 filed in Japan on Feb. 29, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical disk, which optical disk is a data-writable one, comprising:
    an optical disk format that enables defect processing by a plurality of methods and controlled by one of a disk drive and a computer; and
    a defect processing selection area formatted to contain data indicating that a defect processing is to be executed and which of either the disk drive or the computer is to control the defect processing.

2. The optical disk according to claim 1, further comprising:
    a plurality of wobbled guide tracks or prepits provided between wobbled guide tracks,
    wherein at least data concerning an address of said defect processing selection area is recorded by making use of said guide tracks or said prepits.

3. The optical disk according to claim 1, wherein data written in said defect processing selection area is written before shipment of said optical disk, or is written by the disk drive in response to specification by a user or selection of any of an application, an operating system, and a driver software.

4. The optical disk according to claim 1, wherein of the data written in a data-writable optical disk, data not defined in a reproduction-dedicated optical disk is written in an area other than that in which data common to a data-writable optical disk and a reproduction-dedicated optical disk, or in an area not recognized by a reproduction-dedicated disk drive.

5. The optical disk according to claim 1 wherein said optical disk is formatted based on the CLV (Constant Linear Velocity) system.

6. The optical disk according to claim 1 further comprising:
    a plurality of wobbled guide tracks;
    wherein at least data concerning an address of said defect processing selection area is recorded by making use of said guide tracks.

7. The optical disk according to claim 1 further comprising:
    a plurality of wobbled guide tracks; and
    prepits arranged between said wobbled guide tracks,
    wherein at least data concerning an address of said defect processing selection area is recorded by making use of said prepits.

8. An optical disk according to claim 1, the optical disk format further enabling continuous recording on the optical disk.

9. An optical disk according to claim 1, the optical disk format further enabling continuous reproduction from the optical disk.

10. An optical disk according to claim 1, wherein the data indicating that a defect processing is to be executed, and the data indicating which one of the disk drive or the computer is to control defect processing, is written to the defect processing selection area after shipment of the disk from a disk manufacturer.

* * * * *